United States Patent [19]

Lubold, Jr. et al.

[11] Patent Number: 4,479,521
[45] Date of Patent: Oct. 30, 1984

[54] PHOSPHOR MANUFACTURING PROCESS

[75] Inventors: Harvey C. Lubold, Jr.; Glenn H. Roberts, both of Towanda, Pa.

[73] Assignee: GTE Products Corporation, Stamford, Conn.

[21] Appl. No.: 420,144

[22] Filed: Sep. 20, 1982

[51] Int. Cl.³ .............................................. B65B 1/04
[52] U.S. Cl. ...................................... 141/12; 222/77; 252/301.4 P; 366/131
[58] Field of Search .............................. 141/12, 71–81, 141/83; 252/301.6 P, 301.4 P; 222/77; 366/131

[56] References Cited

U.S. PATENT DOCUMENTS 3,994,321  11/1976  Eisenberg .............................. 141/12

Primary Examiner—Houston S. Bell, Jr.
Attorney, Agent, or Firm—J. Theodosopoulos

[57] ABSTRACT

In the manufacture of an alkaline earth halophosphate phosphor, a tray is filled from an automatic loader with a predetermined weight of powder comprising a blend of raw ingredients for forming said phosphor. The filled tray is then vibrated with a pattern inserted therein to settle the powder into a powder mass having a shape that promotes uniformity of reaction when the powder is fired at a temperature that causes the raw ingredients to react and form said phosphor.

3 Claims, 1 Drawing Figure

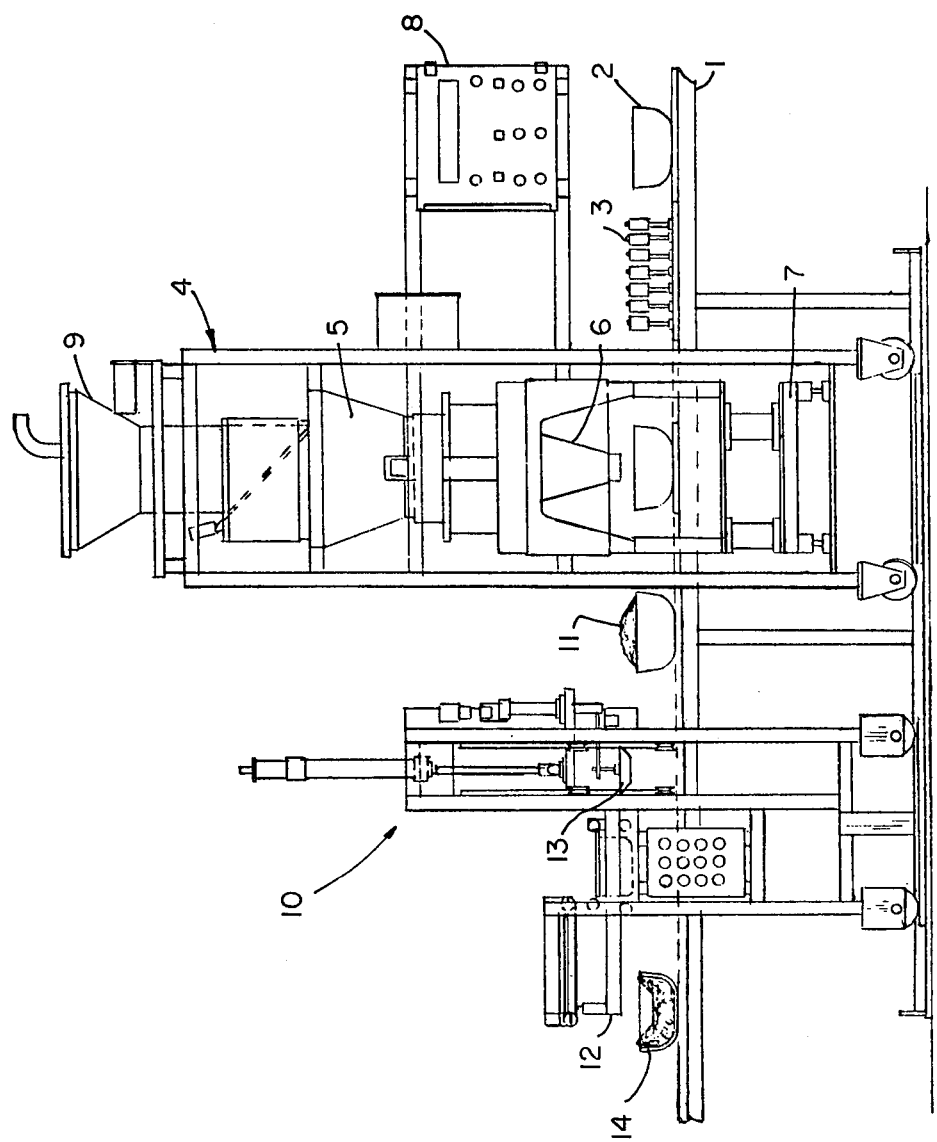

PHOSPHOR MANUFACTURING PROCESS

This invention relates to the manufacture of phosphors, particularly alkaline earth halophosphate phosphors such as are used in fluorescent lamps. The manufacture of such phosphors involves the mixing and thorough blending of predetermined quantities of raw ingredients, followed by firing at a high temperature to react the ingredients to form the phosphor. An example thereof is shown in U.S. Pat. No. 3,655,576.

This invention is particularly concerned with the steps of filling the containers in which the blends of raw materials are fired, and preparing the filled containers for firing.

The drawing is an illustration of apparatus that can be used to carry out the invention.

As shown in the drawing, there is a conveyor 1 on which the containers or trays are carried and moved through the process. The trays are made of a material that can withstand a firing temperature of about 1200° C. An empty tray 2 is shown at the right hand end of conveyor 1. A typical tray is $11\frac{1}{2}$ inches square by $5\frac{1}{2}$ inches deep. As the trays move toward the loading position, guide rollers 3 aid in centrally positioning the trays on the conveyor. Automatic loader 4 comprises hopper 5, chute 6 and load cell 7. The powder, comprising the blended raw ingredients, is stored in hopper 5. Hopper 5 is supported by load cell 7 which continually monitors the weight of powder in hopper 5. When an empty tray 2 is moved into position under chute 6, a signal is given, and powder is discharged from hopper 5 through chute 6 into the empty tray. Load cell 7 monitors the weight of powder discharged from the hopper, and when a predetermined amount, say, $12\frac{1}{2}$ pounds, has been discharged, load cell 7 ceases the discharge. Panel 8 is the control panel for loader 4 and has a digital display of the weight of powder in hopper 5 at all times. When the weight of powder in hopper 5 drops below a predetermined minimum, say, about 15 pounds, a signal is generated which activates a vacuum transfer system. The vacuum transfer system transfers powder from a storage bin (not shown) into holding tank 9 from which the powder drops into hopper 5. Transfer ceases after a predetermined weight, say, 30 pounds, is transferred into hopper 5.

After the trays are filled with powder, they are conveyed from loader 4 to automatic vibrator 10. A filled tray 11 is shown on conveyor 1 between loader 4 and vibrator 10. At vibrator 10, a filled tray is raised about a foot above conveyor 1, and then platform 12 is moved into position under the filled tray so that the filled tray rests on platform 12. Platform 12 is then vibrated to settle the powder in the tray while at the same time a pattern 13 is lowered into the powder, the purpose of which is to suitably shape the powder mass for firing. The pattern and platform are then removed and the filled, shaped tray is returned to conveyor 1. Filled, shaped tray 14 is shown prior to its being conveyed into a furnace (not shown) for firing. The shape of pattern 13 conforms somewhat to the shape of tray 2. Thus, the powder in filled, shaped tray 14 has a more uniform thickness throughout, typically, about $1\frac{1}{2}$ inches, than if no pattern had been used to shape the mass of powder. The purpose of the uniform thickness is to promote uniformity of reaction of the powder during firing.

We claim:

1. In the manufacture of an alkaline earth halophosphate phosphor, the steps which comprise: conveying an empty tray to a position under the discharge chute of an automatic loader, said loader having a hopper containing a powder blend of raw ingredients to form said phosphor; automatically discharging a predetermined weight of said powder from said hopper through said chute into said tray; conveying the tray of powder to an automatic vibrator; and vibrating said tray of powder with a pattern inserted therein to cause the powder to settle into a powder mass having a thickness throughout that tends to promote uniformity of reaction when the powder mass is fired at a temperature that causes the raw ingredients to react and form said phosphor.

2. The process of claim 1 wherein said automatic loader includes means for automatically adding powder to said hopper when the weight of powder therein drops below a predetermined amount.

3. The process of claim 1 wherein said hopper is supported on a load cell which includes means for continually monitoring the weight of powder in said hopper.

* * * * *